United States Patent [19]
Hendershot et al.

[11] Patent Number: 5,746,856
[45] Date of Patent: May 5, 1998

[54] METHOD OF ULTRASONICALLY WELDING ARTICLES OF POROUS POLYTETRAFLUOROETHYLENE

[75] Inventors: William J. Hendershot; Michael L. McDonald; Vivian J. Timian, all of Flagstaff, Ariz.

[73] Assignee: W. L. Gore & Associates, Inc., Newark, Del.

[21] Appl. No.: 637,313

[22] Filed: Apr. 24, 1996

Related U.S. Application Data

[62] Division of Ser. No. 316,054, Sep. 30, 1994, abandoned, which is a continuation of Ser. No. 116,475, Sep. 1, 1993, abandoned, which is a continuation of Ser. No. 866,673, Apr. 10, 1992, abandoned.

[51] Int. Cl.[6] .................................................. B32B 31/16
[52] U.S. Cl. .................. 156/73.4; 156/73.1; 156/157; 156/502; 156/580.1; 156/580.2
[58] Field of Search ................................ 156/73.1, 73.4, 156/157, 159, 308.2, 309.6, 309.9, 502, 505, 580.1, 580.2

[56] References Cited

U.S. PATENT DOCUMENTS

| | | | |
|---|---|---|---|
| 4,247,345 | 1/1981 | Kadija et al. | 156/73.4 |
| 4,283,448 | 8/1981 | Bowman | 428/421 |
| 4,406,720 | 9/1983 | Wang et al. | 156/73.2 |
| 4,490,199 | 12/1984 | Dunning | 156/73.4 |
| 4,770,730 | 9/1988 | Abe | 156/73.1 |
| 4,838,964 | 6/1989 | Thompsen et al. | 156/73.1 |
| 4,957,669 | 9/1990 | Primm | 264/23 |
| 5,085,719 | 2/1992 | Eck | 156/73.4 |
| 5,232,529 | 8/1993 | Miyake | 156/73.4 |
| 5,464,488 | 11/1995 | Servin | 156/73.4 |

FOREIGN PATENT DOCUMENTS

| | | |
|---|---|---|
| 0051957A3 | 5/1982 | European Pat. Off. |
| 0365112A2 | 4/1990 | European Pat. Off. |
| 1267619 | 3/1972 | United Kingdom |
| 2237279 | 5/1991 | United Kingdom |

OTHER PUBLICATIONS

Mozgovoi, I.V., et al. Welding Fluoroplast–4 films. Svarochnoye Proizbodstvo Dec. 1977; No. 5:18–19 (1st page of translation). OMSK Polytechnic Institute, USSR.

*Primary Examiner*—James Sells
*Attorney, Agent, or Firm*—Wayne D. House; Eric J. Sheets

[57] ABSTRACT

A method of welding together overlapped edges of porous PTFE sheet materials by applying ultrasonic energy wherein the overlapped edges remain porous after welding. Composite articles made by the welding process are also described.

12 Claims, 4 Drawing Sheets

METHOD OF ULTRASONICALLY WELDING ARTICLES OF POROUS POLYTETRAFLUOROETHYLENE

This application is a Division of application Ser. No. 08/316,054, filed Sep. 30, 1994, abandoned, which is a Continuation of Ser. No. 08/116,475, filed Sep. 1, 1993, abandoned, which is a Continuation of Ser. No. 07/866,673, filed Apr. 10, 1992, abandoned.

FIELD OF THE INVENTION

This invention relates to the field of ultrasonic welding of porous polymers.

BACKGROUND OF THE INVENTION

Ultrasonic welding has been known for some time to be a useful and practical method of fabricating articles from sheets of polymeric materials by applying ultrasonic energy to the overlapped edges of the sheets of polymeric materials to weld them together. These methods have been applied to welding sheets of porous polymers to other sheets of either porous or non-porous materials. For example, Abe, U.S. Pat. No. 4,770,730, teaches ultrasonic welding of non-porous covering materials to the surface of elastic foam materials by the application of alternating high and low pressure applied from an ultrasonic horn wherein ultrasonic energy is only applied during the reduced pressure portion of the cycle. This method allows the welding of covering materials to foam seat cushions by taking advantage of the elasticity of the foam. The method results in an impermeable construction by welding an impermeable covering material over the foam.

Bowman, U.S. Pat. No. 4,283,448, describes a method of joining segments of shrinkable expanded porous polytetrafluoroethylene by abutting edges of the segments, applying pressure perpendicular to the edges and parallel to the segment surface, restraining the segment from shrinking in any direction and heating the material to above the crystalline melt point of the polytetrafluoroethylene (hereinafter PTFE). While this method joins the abutted edges and maintains the porosity of the abutted edges, it requires heating the entire segment while restraining the segment from shrinkage. Bowman does not suggest the use of ultrasound energy as a means of joining adjacent sheets of porous polytetrafluoroethylene.

Primm, U.S. Pat. No. 4,957,669, teaches the use of ultrasonic energy applied to a tapered metal mandrel for forming tapered vascular grafts from untapered vascular graft tubing of porous expanded PTFE.

Ultrasonic energy has also been used for the manufacture of porous non-woven webbing by a method taught by Wang et al, U.S. Pat. No. 4,406,720.

U.S. Pat. No. 4,247,345 to Kadija et al describes the joining together of synthetic materials to create reinforced liquid-tight seams by placing a strip of thermoplastic sealing material between two overlapping edges of the synthetic materials to be joined, sewing through the resulting three layers and applying ultrasonic energy to melt the thermoplastic strip and form the seal.

GB 2,237,279 A describes the use of ultrasound to sinter crystalline PTFE.

SUMMARY OF THE INVENTION

It has been found that by careful control of the amount of compression applied to two overlapped porous PTFE sheet edges that it is possible to successfully ultrasonically weld those edges together and maintain porosity within the welded areas. Where the porosity of the PTFE is such that the porous PTFE sheet material is inherently waterproof, welded seams made by the method of the present invention have also been waterproof.

Alternatively, if seamline porosity is not required, a thin sheet or film of fluorinated ethylene propylene (hereinafter FEP) may be placed between the overlapped adjacent edges of the porous PTFE prior to welding. Ultrasonic welding of the porous PTFE layers to the intermediate layer of FEP produces seams with greater peel strengths than seams welded without the use of FEP. It is anticipated that other fluoropolymer films such as, for example, perfluoroalkoxy, may also be used.

The method of the present invention is particularly useful for welding together porous implantable materials for the construction of medical devices.

Preferred forms of porous PTFE are porous, expanded PTFE having a microstructure of nodes interconnected by fibrils, made as taught by U.S. Pat. No. 3,953,566; 3,962,153 and 4,187,390.

DETAILED DESCRIPTION OF THE INVENTION

All of the following examples were performed using a Branson 3000 watt, 20 KHz ultrasonic welder comprising a model 921 AES actuator and a model 930M power supply. A power level of about 500 watts was used for all examples. The ultrasonic welder was fitted with a titanium ultrasonic horn about 28 cm long by about 6.4 mm wide, Branson part no. 109-397-211. The surface of the horn was comprised of a coarse male knurl consisting of a series of alternating tetrahedral projections and valleys with a peak to valley height of about 0.6 mm and with the peaks spaced about 1.2 mm apart. The horn was of much greater length than was necessary to manufacture the examples.

Ultrasonically welded seams created by the method of the present invention are identifiable by the patterns left on at least one surface of the welded area by the ultrasonic horn. The horn used to make the following examples produced a series of indentations in the welded area corresponding to the projections of the ultrasonic horn.

For examples incorporating less overlap width than the 6.4 mm width of the ultrasonic horn, the horn was centered over the overlapped edges and extended slightly beyond the overlapped edges. For the samples made with a 3.2 mm wide overlap, the 6.4 mm wide horn extended about 1.6 mm beyond the edges of the overlapped material.

EXAMPLE 1

Figure 1:
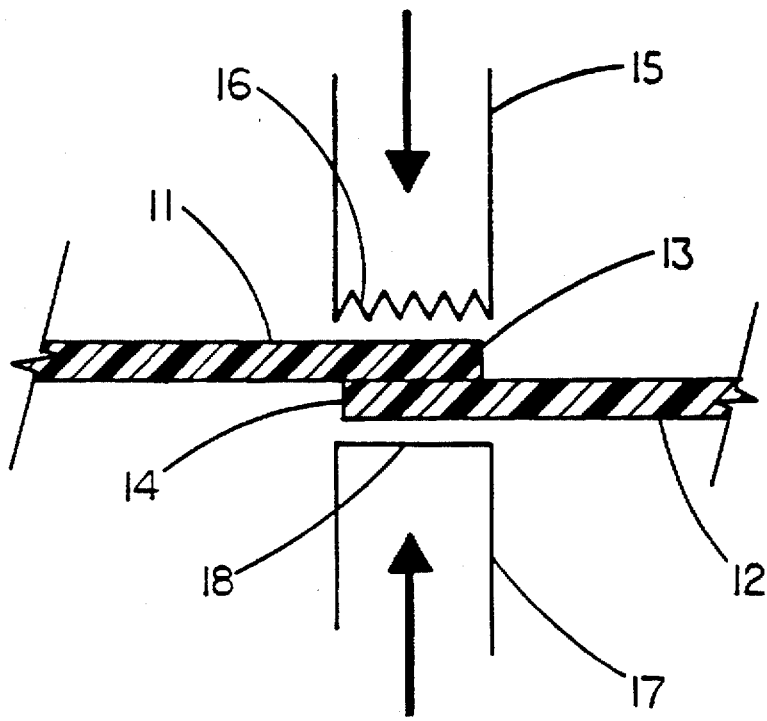
FIG. 1 describes a cross section of an ultrasonically welded seam formed from two overlapped edges of sheets of porous PTFE by the method of the present invention.

As shown by the cross section of FIG. 1, the edges 13 and 14 of 5 cm by 5 cm sheets 11 and 12 of 1.0 mm thick .GORE-TEX® Soft Tissue Patch material (W. L. Gore & Associates, Flagstaff, Ariz.) were overlapped by controlled amounts ranging from 1.0 mm to 6.4 mm and compressed between the horn 15 of the ultrasonic welder and an aluminum anvil 17 having a relatively smooth anvil surface 18. The distance between the peaks of the ultrasonic horn and the anvil, that is, the closest proximity of the horn to the anvil, was set to different amounts ranging from 0.71 mm to 1.24 mm. Ultrasonic energy was applied immediately upon achieving the above amount of compression for a period of 10 seconds, after which the compression was maintained for an additional 10 seconds and then released. Various samples were made according to this description as summarized by the data presented in Tables 1–4. The overall thickness of the welded area of one sample from each group was measured by gently fitting a set of digital calipers over the welded area to avoid compressing the welded material while taking the measurement.

The welded, overlapped edges retained the white, opaque appearance of porous, unadulterated PTFE, as opposed to the translucent appearance of solid, non-porous, unadulterated PTFE which has a density considered to be about 2.2 g/cc. This compares with a nominal density of porous GORE-TEX Soft Tissue Patch before compression and welding of about 0.41 g/cc. The density of the welded area of one sample from each group was determined by cutting the welded portion from a randomly selected sample from each group using a sharp scalpel blade, measuring its dimensions to determine its volume, and weighing it. The volume of the indentations caused by the projections 16 of the ultrasonic horn was subtracted from the sample volume. This was done by measuring the base area and depth of a representative indentation and calculating the volume of that sample indentation. Each indentation had a tetrahedral shape corresponding to the tetrahedral shape of the horn projections 16. The total quantity of indentations was multiplied by the sample indentation volume calculated as described above to give the total indentation volume. This total indentation volume was then subtracted from the gross volume of the welded sample as calculated by multiplying the area of the sample by its overall thickness. The gross volume minus the calculated total indentation volume was used to determine the density of the welded sample.

The break strength of the welded samples was measured at room temperature with an Instron model 4201 tensile tester fitted with a 50 kg load cell. The welded samples were cut with a die cutter into 2.5 cm width by 7.5 cm length samples with the weld located in the center of the length of the sample and running across the full width of the sample perpendicular to the length. A sample was gripped between the vertically opposed grips of the Instron with a gauge length of 1.9 cm. The weld was horizontally oriented and centered in the space between the opposed grips. Flat, smooth rubber-faced grips, 2.5 cm high by 3.75 cm wide, Instron part no. 2702-015, were used. The grips were then used to apply force to the 2.5 cm wide weld by moving the grips apart at a rate of 200 mm per minute until the sample broke; the force value at which the break occurred was then read from the Instron display and recorded. The mean break force values for the various groups of samples are shown in Table 1 along with comparative results for control samples of the same size of continuous, unwelded material. All welded samples failed at the weld.

Figure 2:
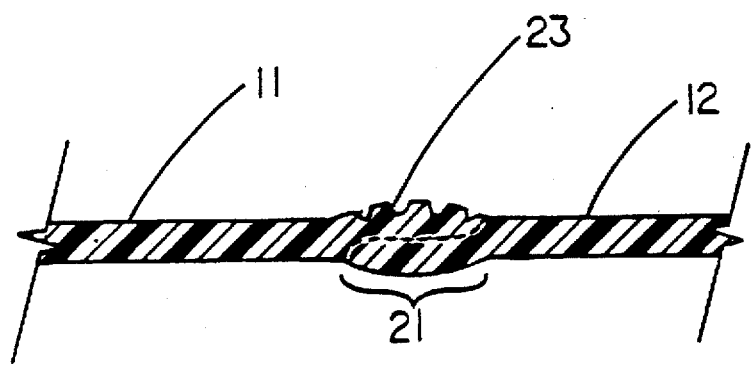
FIG. 2 describes a cross section of the overlapped edges of sheets of porous PTFE after welding by the method described by FIG. 1.

FIG. 2 describes a cross section of the two overlapped edges of the sheets of porous PTFE after welding. The welded region 21 is typically thicker than the nominal thickness of the unwelded portions of the sheets. The density of the welded region 21 is greater than that of the unwelded portions of the sheets but still significantly less than the density of non-porous PTFE. Indentations 23 caused by the projections 16 of the ultrasonic horn 15 should be taken into account as described previously when calculating the density of the welded region 21.

TABLE 1

| Group No. | Horn-Anvil Distance (mm) | Welded Overlap Width (mm) | Weld Dens. (g/cc) | Overall Weld thick (mm) | Mean Force To Break (kg) | N | Std. Dev. |
| --- | --- | --- | --- | --- | --- | --- | --- |
| 1 | 0.89 | 6.4 | 1.35 | 0.94 | 19.68 | 10 | 2.07 |
| 2 | 1.24 | 6.4 | 1.07 | 1.24 | 2.09 | 5 | 1.38 |
| 3 | 0.89 | 3.2 | 1.35 | 0.94 | 16.93 | 5 | 1.05 |
| Control | — | — | — | — | 20.35 | 5 | 0.39 |

EXAMPLE 2

Figure 3:
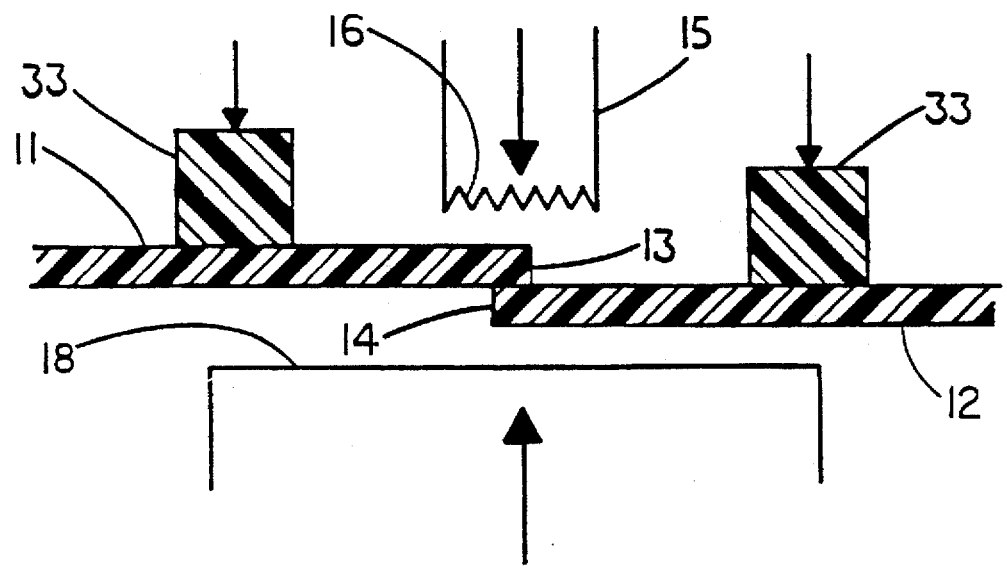
FIG. 3 describes a cross section of an ultrasonically welded seam formed from two 1.0 mm wide overlapped edges of sheets of porous PTFE by the method of the present invention.

An additional group of samples was made using the method of Example 1 except that an overlap of only 1.0 mm was used. As shown by FIG. 3, sheets 11 and 12 were supported by the anvil surface 18. It was found that the narrow 1.0 mm overlap allowed the overlapped edges to move with respect to each other during the application of ultrasonic energy, resulting in the complete loss of overlap at various locations along the length of the weld. Placing a 1 cm thick strip 33 of Delrin over the sheets 11 and 12 of material to be welded so that the Delrin acted as a clamp to limit movement of the sheets during welding produced acceptable results about one fourth of the time. The Delrin clamping strips 33 were placed about 1 cm from the sides of the ultrasonic horn 15; a slight amount of downward force was applied to the Delrin strips during welding to enable them to function as clamps. It is anticipated that closer placement of the clamps to the sides of the ultrasonic horn would further increase the effectiveness of the clamps.

About 20 attempts were made to produce welded samples having 1.0 mm overlapped edges. Five of these were considered to be relatively acceptable welds having less than 0.25 mm variation after welding from the 1.0 mm overlapped edge width set up prior to the application of ultrasonic energy. Test data from these samples are provided in Table 2.

Further refinement of this process is expected to substantially increase the proportion of successful welds. It is believed that one cause of the relative movement between the 1.0 mm wide overlapped edges is due to the wide 1.2 mm spacing between the projections of the ultrasonic horn. A horn with projections spaced closer together than the width of the overlapped edges is expected to produce more consistently successful welds.

TABLE 2

| Group No. | Horn-Anvil Distance (mm) | Welded Overlap Width (mm) | Weld Dens. (g/cc) | Overall Weld thick (mm) | Mean Force To Break (kg) | N | Std. Dev. |
| --- | --- | --- | --- | --- | --- | --- | --- |
| 4 | 0.89 | 1.0 | 1.35 | 0.94 | 10.56 | 5 | 0.38 |

EXAMPLE 3

Figure 4:
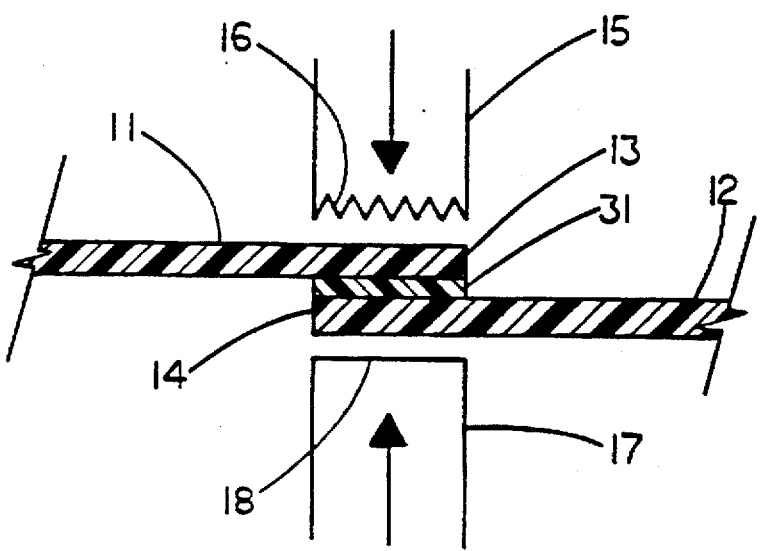
FIG. 4 describes a cross section of an alternative embodiment wherein a sheet of FEP film is placed between the overlapping edges of the sheets of porous PTFE prior to welding.

Additional samples were made according to the method of Example 1, except that a sheet 31 of 0.025 mm thick FEP non-porous film (DuPont de Nemours, Wilmington, Del.) was placed between the overlapping edges of the sheets of porous PTFE as shown by the cross section of FIG. 4. All samples were tested for force-to-break as described in Example 1. The results are described in Table 3 in comparison with the same control group results shown previously in Table 1. For the calculation of the density of the welded areas, the effect of the presence of the FEP film was found to be negligible because the FEP film was very thin relative to the PTFE sheets, and therefore was ignored for these density calculations. If the thickness of the FEP film is more than about 10 percent of the thickness of the total welded sample, then the presence of the FEP should be taken into account when determining density of the weld by subtracting the volume of the FEP from the volume of the welded sample.

TABLE 3

| Group No. | Horn-Anvil Distance (mm) | Welded Overlap Width (mm) | Weld Dens. (g/cc) | Overall Weld thick (mm) | Mean Force To Break (kg) | N | Std. Dev. |
| --- | --- | --- | --- | --- | --- | --- | --- |
| 5 | 0.71 | 6.4 | 1.46 | 0.81 | 22.42 | 5 | 0.71 |
| 6 | 0.89 | 6.4 | 1.35 | 0.94 | 20.77 | 10 | 1.18 |
| 7 | 0.99 | 6.4 | 1.25 | 1.02 | 21.51 | 5 | 0.81 |
| 8 | 1.24 | 6.4 | 1.07 | 1.24 | 5.99 | 10 | 0.71 |
| 9 | 0.89 | 3.2 | 1.35 | 0.94 | 20.31 | 5 | 0.79 |
| 10 | 0.89 | 1.0 | 1.35 | 0.94 | 10.32 | 5 | 0.56 |
| Control | — | — | — | — | 20.35 | 5 | 0.39 |

EXAMPLE 4

Figure 5:
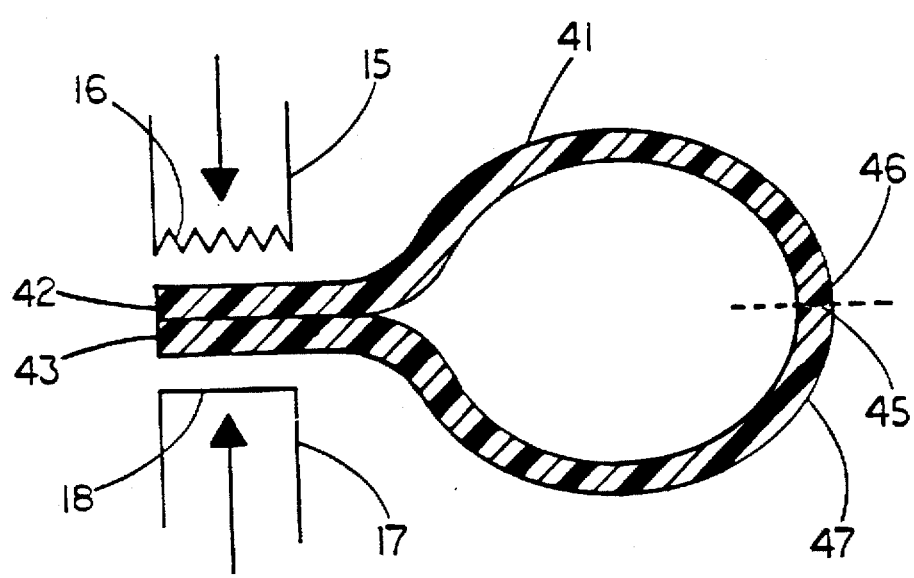
FIG. 5 describes an alternative method of welding together overlapped edges useful for peel testing of the weld.

FIG. 5 shows an alternative method of welding together overlapped edges 42 and 43 of a strip or sheet 41 of porous PTFE. The method is useful for destructively peel testing the strength of welds formed by the method of the present invention. Alternatively, the method of FIG. 5 may be used to form tubes, bags or containers of porous PTFE.

For the peel testing data described by Table 4 below, the edges 42 and 43 of strip 41 of 1 mm thick GORE-TEX Soft Tissue Patch were welded together as described previously and summarized in Table 3. After welding, each strip was cut along its width at line 45 approximately opposite the weld to create new edges 46 and 47. The strip was then cut using a die cutter to a width of about 1.27 cm and length of about 7.62 cm so that the welded region was perpendicular to the length of the sample and running across the full 1.27 cm width at about the midpoint of the sample length. The sample was then tested in the Instron using the same technique as described in Example 1. The maximum force required to peel the welded region apart was then read from the Instron display and recorded.

TABLE 4

| Group No. | Horn-Anvil Distance (mm) | Welded Overlap Width (mm) | Weld Dens. (g/cc) | Overall Weld thick (mm) | Mean Force To Break (kg) | N | Std. Dev. |
| --- | --- | --- | --- | --- | --- | --- | --- |
| 11 | 0.89 | 6.4 | 1.35 | 0.94 | 2.24 | 10 | 0.60 |
| 12 | 1.24 | 6.4 | 1.07 | 1.24 | 0.23 | 5 | 0.16 |

EXAMPLE 5

Additional peel test samples were made by the method described for Example 4 except using an additional layer of 0.025 mm FEP sheet between the overlapped edges as described previously for Example 3. The peel test data are described in Table 5; it is apparent that the presence of the FEP increased the peel strength of the weld which may be desirable for some applications.

TABLE 5

| Group No. | Horn-Anvil Distance (mm) | Welded Overlap Width (mm) | Weld Dens. (g/cc) | Overall Weld thick (mm) | Mean Force To Break (kg) | N | Std. Dev. |
| --- | --- | --- | --- | --- | --- | --- | --- |
| 13 | 0.89 | 6.4 | 1.35 | 0.94 | 6.01 | 10 | 1.05 |
| 14 | 1.24 | 6.4 | 1.07 | 1.24 | 0.69 | 5 | 0.49 |

EXAMPLE 6

Figure 6:
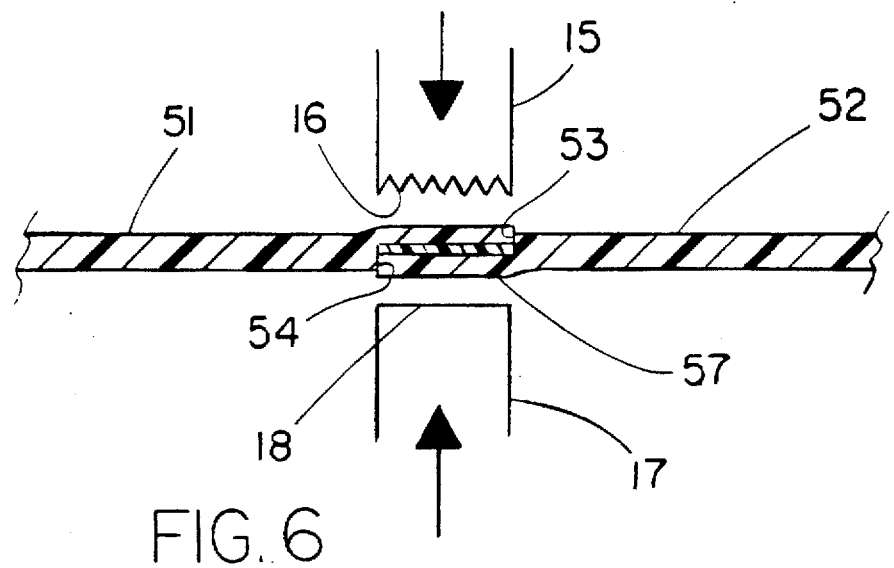
FIG. 6 describes a cross section of an alternative embodiment wherein the sample edges are split in half to reduce the thickness of the weld area.

FIG. 6 describes five samples made by splitting the thickness of one edge 53 of a sheet 51 of 1 mm thick GORE-TEX Soft Tissue Patch with the aid of a scalpel blade to a depth of about 6.4 mm so that two approximately 0.5 mm thick layers were created. One of the two layers was then carefully cut away using the scalpel blade leaving edge 53 about 0.5 mm thick and about 6.4 mm wide. The same thing was done to one edge 54 of a second sheet 52 of the same material. The modified edges 53 and 54 were overlapped with a strip 57 of 0.025 mm thick FEP film placed between the overlapped, modified edges 53 and 54. The overlapped, modified edges were then ultrasonically welded as described previously by compressing the edges between the horn 15 and anvil 17 which were spaced 0.91 mm apart. When tensile tested as described by Example 1, the five samples had a mean break strength of 8.34 kg with a standard deviation of 0.55 kg.

EXAMPLE 7

Figure 7:
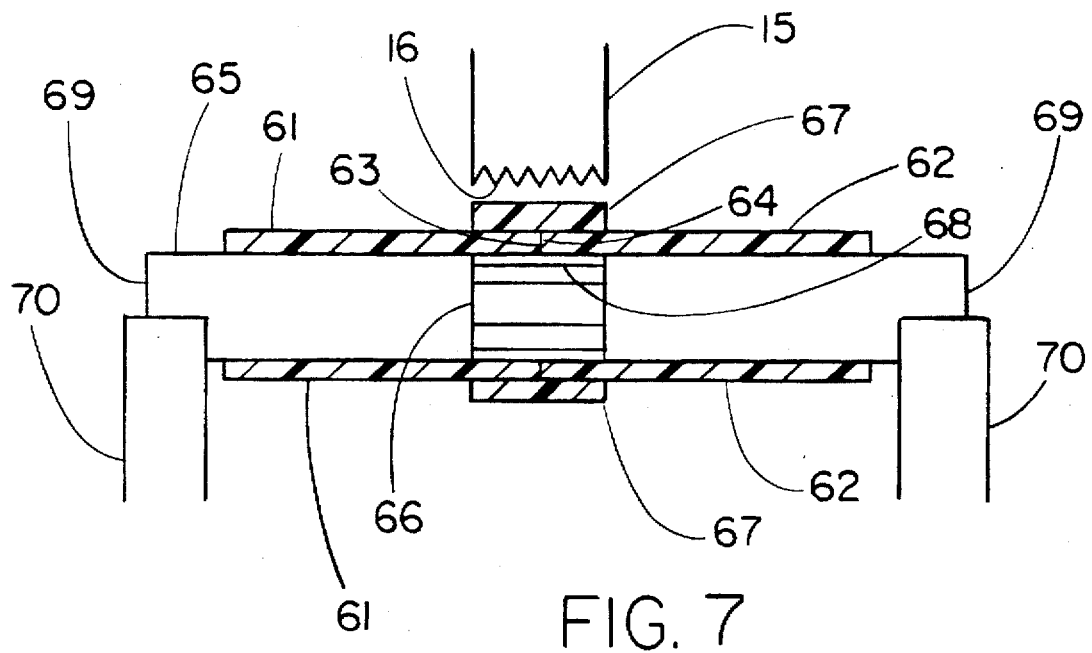
FIG. 7 describes a cross section of an alternative embodiment wherein the abutted edges of two adjacent sheets or tubes of porous PTFE are overlapped by a strip of porous PTFE and ultrasonically welded together.

A 10.2 cm length of cylindrical aluminum mandrel 65 of 16.0 mm diameter had the center 1.9 cm portion of its length machined into an octagonal cross section 66 having a diameter of 16.0 mm measured between opposing corners of the octagon. Each sample was prepared by fitting two 5 cm lengths 61 and 62 of a 16 mm GORE-TEX® Vascular Graft over the mandrel as shown by FIG. 7 so that the graft ends 63 and 64 abutted. The grafts were a slight interference fit over the surface of the mandrel. Each graft sample was uniformly compressed in a longitudinal direction to a length of about 3.8 cm, which caused the graft samples to apply compression to the abutted graft ends. A 0.95 cm length of 18 mm GORE-TEX Vascular Graft 67 was fitted concentrically over the 16 mm grafts with the center of its length located over the abutting edges of the 16 mm grafts.

After the mandrel was placed into a supporting fixture, an exponential ultrasonic horn 15 (Branson part no. 604-001-021) was used to compress the assembled grafts against a flat surface 68 of the octagonal portion of the mandrel. The mandrel ends 69 were provided with supports 70 which allowed the flat surface 68 to serve as the anvil during the welding process.

The exponential ultrasonic horn was used with a circular tip (Branson part no. 101-148-011). The circular tip surface was machined to a rectangular shape 9.5 mm by 6.4 mm. The horn tip surface 16 was comprised of a coarse male knurl consisting of a series of alternating tetrahedral projections and valleys with a peak to valley height of about 0.6 mm with the peaks spaced about 1.2 mm apart.

The long dimension of the horn tip was oriented perpendicular to the longitudinal axis of the mandrel. The 6.4 mm width of the horn was centered over the abutted edges of the 16 mm vascular grafts so that 3.2 mm of material adjacent to the edge of each tube was compressed by the horn. The distance between the horn and the flat surface of the mandrel was controlled to a specific amount, ultrasonic energy was applied for a controlled amount of time and finally the horn was held in place for an additional hold time without ultrasonic energy before being moved away from the mandrel. This procedure was repeated after rotating the mandrel to bring an unwelded segment into place below the horn until all eight segments of the tube were welded.

The resulting welded areas retained the white opaque appearance of porous expanded PTFE as opposed to the clear, translucent appearance of non-porous PTFE.

After completion each sample was fitted to a test rig that applied 180 mm Hg water pressure to the welded vascular graft assembly for 65 seconds at room temperature to test for leaks. Any water drops escaping from the tube during this test constituted failure. Sample manufacturing parameters and test results are summarized in Table 6.

A density measurement was made from a single sample welded area from one sample tube out of group 15; the density was determined to be 1.51 g/cc.

TABLE 6

| Group No. | N | FEP (Y/N) | Horn-Mandrel Distance (mm) | Weld Time (sec.) | Hold Time (sec.) | Leak Test (Pass/Fail) |
|---|---|---|---|---|---|---|
| 15 | 3 | N | 0.28 | 0.400 | 0.500 | P |
| 16 | 1 | N | 0.28 | 0.750 | 0.500 | P |
| 17 | 1 | N | 0.20 | 1.000 | 0.050 | F |
| 18 | 3 | Y | 0.28 | 0.400 | 0.500 | P |
| 19 | 1 | Y | 0.28 | 0.750 | 0.500 | P |
| 20 | 1 | Y | 0.28 | 1.000 | 0.050 | F |

EXAMPLE 8

Additional samples were made according to Example 1 except that one of the sheets of GORE-TEX Soft Tissue Patch was replaced by a sheet of GORE-TEX® Surgical Membrane having a nominal density of about 0.91 g/cc. A horn anvil distance of 0.48 mm did not produce a useful bond. The results are described in Table 7.

TABLE 7

| Group No. | Horn-Anvil Distance (mm) | Welded Overlap Width (mm) | Weld Dens. (g/cc) | Overall Weld thick (mm) | Mean Force To Break (kg) | N | Std. Dev. |
|---|---|---|---|---|---|---|---|
| 21 | 0.41 | 6.4 | 1.13 | 0.64 | 0.25 | 5 | 0.03 |
| 22 | 0.48 | 6.4 | — | — | 0 | 5 | — |

EXAMPLE 9

Additional samples were made according to Example 2 except that one of the sheets of GORE-TEX Soft Tissue Patch was replaced by a sheet of GORE-TEX Surgical Membrane having a nominal density of about 0.91 g/cc. The results are described in Table 8.

TABLE 8

| Group No. | Horn-Anvil Distance (mm) | Welded Overlap Width (mm) | Weld Dens. (g/cc) | Overall Weld thick (mm) | Mean Force To Break (kg) | N | Std. Dev. |
|---|---|---|---|---|---|---|---|
| 23 | 0.48 | 6.4 | 1.13 | 0.64 | 10.14 | 5 | 0.14 |
| 24 | 0.56 | 6.4 | 1.13 | 0.64 | 9.48 | 5 | 0.31 |

We claim:

1. A method of welding together sheets of porous polytetrafluoroethylene material, comprising:
   a) overlapping adjacent edges of two sheets of porous polytetrafluoroethylene;
   b) placing the overlapped adjacent edges between an ultrasonic welding horn and a metal anvil;
   c) compressing the overlapped adjacent edges between the ultrasonic welding horn and the metal anvil while limiting the distance between the ultrasonic welding horn and the metal anvil in such a way as to retain porosity within the overlapped edges of the two sheets of porous polytetrafluoroethylene; and
   d) applying ultrasonic energy to the ultrasonic horn for a time sufficient to weld together the overlapped adjacent edges such that the polytetrafluoroethylene material of the welded edges is porous having a density less than about 2.0 g/cc after welding.

2. A method according to claim 1 wherein the overlapped adjacent edges have a density of less than about 1.5 g/cc after welding.

3. A method according to claim 1 wherein the overlapped adjacent edges have a density of less than about 1.2 g/cc after welding.

4. A method according to claim 1 wherein a sheet of fluorinated ethylene propylene film is placed between the overlapped adjacent edges of porous polytetrafluoroethylene prior to compressing and welding.

5. A method according to claim 2 wherein a sheet of fluorinated ethylene propylene film is placed between the overlapped adjacent edges of porous polytetrafluoroethylene prior to compressing and welding.

6. A method according to claim 3 wherein a sheet of fluorinated ethylene propylene film is placed between the overlapped adjacent edges of porous polytetrafluoroethylene prior to compressing and welding.

7. A method of welding together sheets of porous polytetrafluoroethylene material, comprising:
   a) abutting adjacent edges of two sheets of porous polytetrafluoroethylene;

b) placing a strip of porous polytetrafluoroethylene sheet material having a width of at least about 2.0 mm over the abutting edges of the two adjacent sheets of porous polytetrafluoroethylene so that the abutting adjacent edge of each of the two sheets of porous polytetrafluoroethylene is overlapped by at least about 1.0 mm of the width of the strip of porous polytetrafluoroethylene sheet material;

c) compressing the strip of porous polytetrafluoroethylene and the abutting adjacent edges of the two sheets of porous polytetrafluoroethylene between an ultrasonic welding horn and a metal anvil while limiting the distance between the ultrasonic welding horn and the metal anvil in order to retain porosity within the overlapped edges of the two sheets of porous polytetrafluoroethylene; and d) applying ultrasonic energy to the ultrasonic horn for a time sufficient to weld together the strip of porous polytetrafluoroethylene and the abutting adjacent edges of the two sheets of porous polytetrafluoroethylene;

wherein the strip of porous polytetrafluoroethylene and the abutting adjacent edges of the two sheets of porous polytetrafluoroethylene have a density of less than about 2.0 g/cc after welding.

8. A method according to claim 7 wherein the strip of porous polytetrafluoroethylene and the abutting adjacent edges of the two sheets of porous polytetrafluoroethylene have a density of less than about 1.5 g/cc after welding.

9. A method according to claim 7 wherein the strip of porous polytetrafluoroethylene and the abutting adjacent edges of the two sheets of porous polytetrafluoroethylene have a density of less than about 1.2 g/cc after welding.

10. A method according to claim 7 wherein a sheet of fluorinated ethylene propylene film is placed between the strip of porous polytetrafluoroethylene sheet material and the abutting adjacent edges of two sheets of porous polytetrafluoroethylene prior to compressing and welding.

11. A method according to claim 8 wherein a sheet of fluorinated ethylene propylene film is placed between the strip of porous polytetrafluoroethylene sheet material and the abutting adjacent edges of two sheets of porous polytetrafluoroethylene prior to compressing and welding.

12. A method according to claim 9 wherein a sheet of fluorinated ethylene propylene film is placed between the strip of porous polytetrafluoroethylene sheet material and the abutting adjacent edges of two sheets of porous polytetrafluoroethylene prior to compressing and welding.

* * * * *